F. S. THOMPSON.
LATHE TURRET.
APPLICATION FILED AUG. 2, 1909.
946,924.
Patented Jan. 18, 1910.
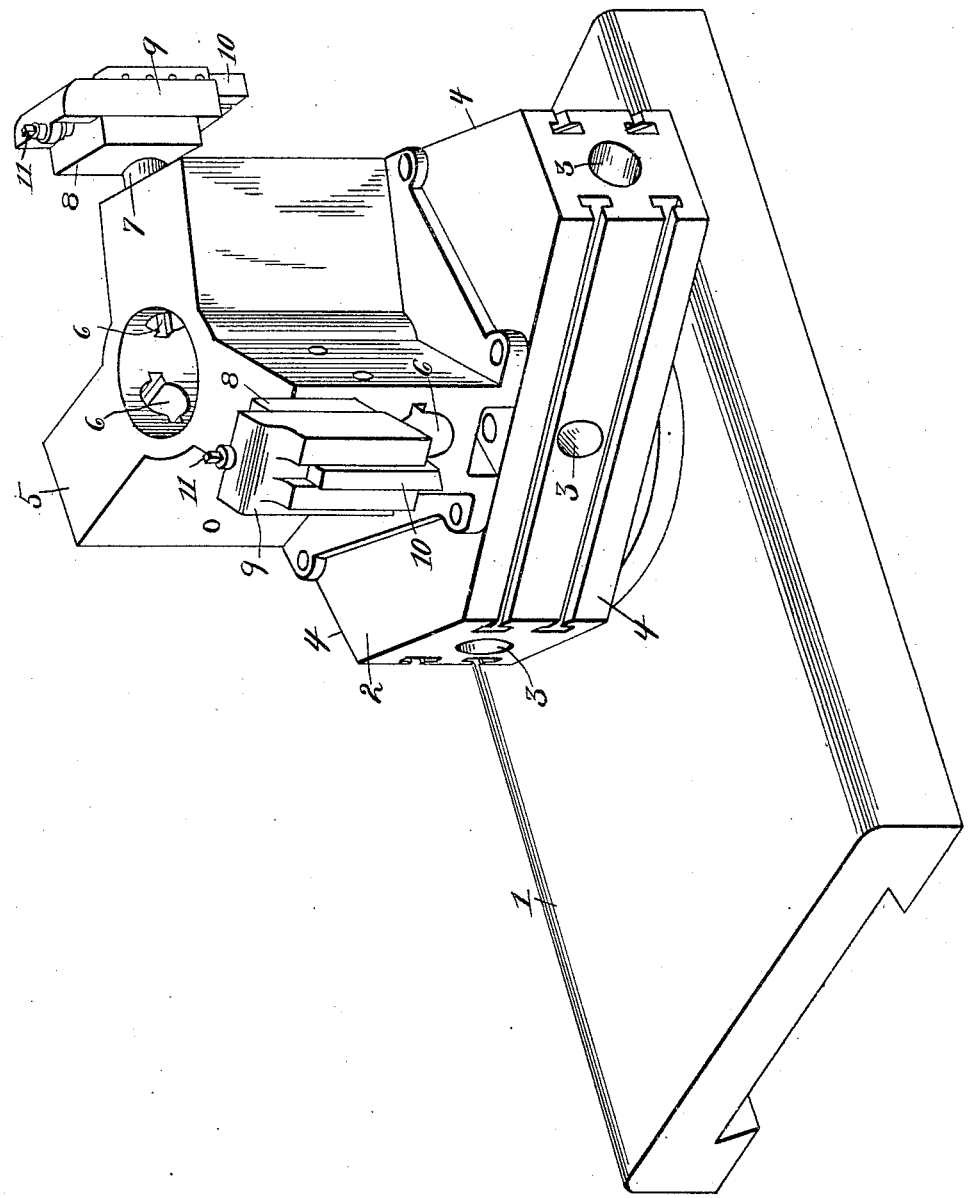
Frederick Samuel Thompson
Witnesses:
Edgar A. Belden.
Th. S. Belden.
Inventor
by James W. See
Attorney

UNITED STATES PATENT OFFICE.

FREDERICK SAMUEL THOMPSON, OF PLAINFIELD, NEW JERSEY, ASSIGNOR TO THE NILES-BEMENT-POND COMPANY, OF JERSEY CITY, NEW JERSEY.

LATHE-TURRET.

946,924.

Specification of Letters Patent.

Patented Jan. 18, 1910.

Application filed August 2, 1909. Serial No. 510,724.

*To all whom it may concern:*

Be it known that I, FREDERICK SAMUEL THOMPSON, a citizen of the United States, and a resident of Plainfield, New Jersey, have invented certain new and useful Improvements in Lathe-Turrets, of which the following is a specification.

My invention relates to lathe turrets and particularly to an improved means for carrying secondary tools designed to operate on the work.

The accompanying drawing, and the following description set forth in detail certain mechanism embodying the invention, such disclosed means constituting, however, but one of various mechanical forms in which the principle of the invention may be used.

The drawing is a perspective view of a lathe turret embodying my invention.

In the drawing:—1, indicates the usual turret-slide adapted to move longitudinally on the lathe bed; 2, the usual turret mounted for rotation on the slide on a vertical axis, the illustration showing this turret as being of a known form provided with radial sockets for receiving the shanks of tools, these sockets being in the horizontal plane of the axis of the lathe, and the periphery of the turret being provided with flat surfaces against which tools may be bolted: 3, the radial sockets of the turret: 4, the flat peripheral surfaces of the turret: 5, a super-turret separably bolted to the top of the main turret and turning and sliding in unison with the main turret: 6, radial sockets formed in the super-turret, there being a series of these sockets disposed in one horizontal plane of the super-turret and another series disposed in a lower horizontal plane: 7, tool shanks to engage these sockets: 8, a head on the outer end of each shank: 9, a vertical slide on each head: 10, a downwardly presenting tool carried by each slide: and 11, screws for vertically adjusting the slides.

While the tools which will be carried by the main turret will operate on the work as usual in the horizontal plane of the axis of the lathe, the tools carried by the super-turret may operate very considerably above that plane. For instance, while a tool of the main turret is operating as usual at the central portion of a piece of work a tool of the super-turret may be turning a rather large flange on the piece of work. The tools of the super-turret may operate on work of considerable diameter if the tools are carried in the lower sockets of the super-turret, but by employing the upper sockets work may be done on very extended diameters.

Screws 11 serve as means for adjusting the tools downwardly to secure proper diameter of work. The tools carried by the super-turret may not only be turning tools to operate upon the periphery of a piece of work of considerable diameter, but they may also be facing tools to operate upon the face of large work. The shank and socket system for securing the tools in the super-turret is to be considered as typical only, and the shanks of the tools may be secured in the sockets of the super-turret by any of the usual securing devices, such as set screws, clamps etc.

The tools of the super-turret may not only move forward with the general structure and thus turn the periphery of the work as the turret-slide advances, but with the turret-slide held stationary a turret-tool may be moved downward or upward in various facing operations.

The illustration assumes the main turret as having six angular tool-receiving positions, as represented by the radial sockets 3, and the illustrated super-turret is provided with but three angular tool positions, which are to coincide with three of the angular tool positions of the main turret. In the illustration the main turret is of generally triangular form, the extended flat surfaces 4 being comparatively close to the center of the turret. The tools of the super-turret are arranged over the centers of length of the flat sides of the main turret, thus permitting the tools of the super-turret to operate on work brought well toward the center of the turret.

I claim:—

1. A lathe turret comprising, a main turret mounted to slide and rotate, a super-turret rigidly but separably secured against the main turret and provided with a plurality of tool-receiving features in the vertical planes of tool-receiving features of the main turret, and vertically adjustable tool carrying slides carried in the tool-receiving features of the super-turret, combined substantially as set forth.

2. A lathe turret comprising, a main turret mounted to slide and rotate, a super-turret rigidly but separably secured against the main turret, the super-turret being provided with a series of radial sockets in a horizontal plane and with a second series of radial sockets in a lower horizontal plane, the several sockets being in the vertical planes of tool-receiving features of the main turret, and vertically adjustably tool carrying slides carried by the radial sockets, combined substantially as set forth.

FREDERICK SAMUEL THOMPSON.

Witnesses:
GEORGE E. GREENLEAF,
GEO. B. WEAR.